United States Patent [19]  [11]  4,266,644
Linsay  [45]  May 12, 1981

[54] TORQUE LIMITING AND SHOCK ABSORBING COUPLING

[76] Inventor: Michael Linsay, 4048 Charlton Rd., South Euclid, Ohio 44121

[21] Appl. No.: 972,679

[22] Filed: Dec. 26, 1978

[51] Int. Cl.³ ............................ F16D 7/00; F16D 3/00
[52] U.S. Cl. .................................. 192/56 R; 64/28 R; 192/55; 192/103 R
[58] Field of Search ................ 192/56 R, 55, 103 R; 64/18, 28 R, 27 R, 30 R

[56] References Cited

U.S. PATENT DOCUMENTS 2,575,475  11/1951  Stutzke ........................... 64/28 R X
3,488,980  1/1970  Burrough ........................... 64/30 R

FOREIGN PATENT DOCUMENTS 540076  2/1977  U.S.S.R. ............................. 192/56 R

Primary Examiner—Rodney H. Bonck
Attorney, Agent, or Firm—Maky, Renner, Otto & Boisselle

[57] ABSTRACT

A torque limiting coupling comprises rotary input and output members which are interconnected for limited torque transmission therebetween by coupling elements secured respectively to such members which are caused at a predetermined or overload torque to oscillate pivotally thus limiting the torque transmitted. According to a preferred construction, the input and output members are coupled by gimballed joints which are yieldingly restrained from free swiveling for permitting transmission of torque. The yielding restraint permits only a limited torque to be transmitted such that, if such limited torque is exceeded, swiveling of the gimballed joints causes the input and output members to slip relative to each other.

16 Claims, 9 Drawing Figures

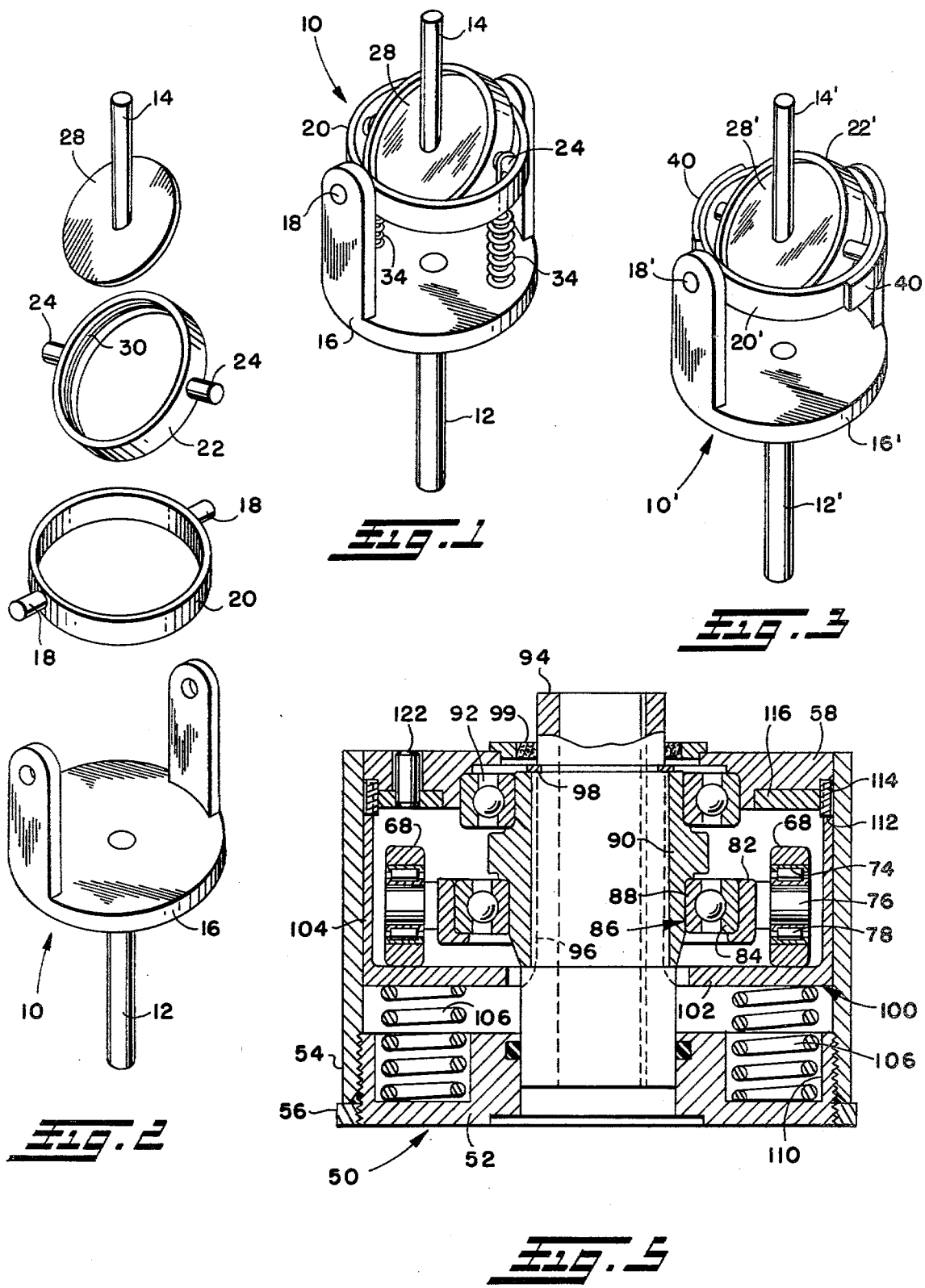

TORQUE LIMITING AND SHOCK ABSORBING COUPLING

FIELD OF THE INVENTION

This invention relates generally to a torque limiter, and more particularly to a torque limiting coupling or device of the type normally intended to safeguard a drive or transmission line from excessive and/or damaging torques. The coupling of the invention is also useful as a shock absorbing device safeguarding against sudden surges, shock loads or machine jams, and/or as a centrifugal clutch allowing acceleration of high inertia bodies without causing high starting torques in the driving prime mover.

BACKGROUND OF THE INVENTION

Known torque limiters generally are of two types, i.e., a friction type and an interlocking claw or jaw type, and are subject to several shortcomings which make use of the same undesirable in many applications. Particularly, the friction type torque limiter commonly employs cooperating, spring-loaded friction surfaces for torque transmission with overload torques causing the friction surfaces to slip relative to one another. Such torque limiters are subject to premature and detrimental wear and require frequent adjustment depending on environmental conditions and wear of the friction surfaces to maintain accurate torque limiting control. The jaw type torque limiter employs as torque transmitting elements spring-loaded interlocking tapered jaws which are urged axially apart by the driving torque to disconnect the input and output on overload. In some designs, the tapered jaws are replaced by spring-loaded balls which are driven by excessive torques from indentations in cooperating elements or races. Such type of torque limiter is also subject to premature or undesirable wear particularly under high speed and continuous slip conditions. In any event, the torque limiters usually must be mounted on the low speed side of the drive train, and further, not all such limiters are bi-directional as often is desirable. Moreover, such torque limiters act as relatively rigid couplings at torques below overload and shock loads at such lower torques are transmitted through the torque limiter.

Accordingly, use of known torque limiters in limited or restricted, and such known torque limiters are subject to premature wear particularly under high speed and continuous slip conditions.

SUMMARY OF THE INVENTION

In contradistinction to known torque limiters, it is believed that the torque limiter according to this invention can be used under high speed conditions and can withstand overload torques, i.e., continuous slip conditions, for extended lengths of time, and it is accordingly an object of the invention to achieve such desirable features.

Another object of the invention is to provide such a torque limiter which is durable and reliable and ensures optimum performance and uniformly repeatable torque-limiting characteristics over long periods of operation.

Still another object of the invention is to provide such a torque limiter having provision for easy and rapid torque adjustment.

Yet another object of the invention is to provide such a torque limiter having provision for automatic overload disengage.

Still yet another object of the invention is to provide such a torque limiter which is easily and effectively sealed against dust or foreign matter and/or against leakage of lubricating fluid.

A further object of the invention is to provide a rotary coupling according to the invention which can be utilized as a rotary motion shock absorber which at lower torques may act as a relatively rigid coupling and at higher torques below a predetermined limiting torque acts as a relatively soft and shock absorbing coupling.

Yet a further object of the invention is to provide such a rotary coupling which acts as a relatively soft or shock absorbing coupling over the entire range of torques that can be transmitted therethrough.

A still further object of the invention is to provide a rotary coupling according to the invention which can be utilized as a centrifugal clutch either with or without provision for overload disengage or slip.

These and other objects, such as will become apparent as the following description proceeds, are achieved by a rotary coupling which is characterized by a drive and driven member in coupled relationship with at least one coupling element mounted for pivotal oscillatory movement to one of said members to permit independent rotation of the drive and driven members, and means normally for restraining such oscillation for transmitting torque, except at an overload torque where the coupling element is caused to oscillate thus limiting the maximum torque transmitted by the coupling.

A preferred rotary coupling construction according to the invention comprises a driving and driven member interconnected by gimballed joints which allow, absent restraint, the members to rotate independently of each other. The gimballed joints comprise a pair of gimbal rings secured to one of the members, and one of the gimbal rings is in sliding relationship and inclined to a plane normal to the members' axes by a swash plate or the like connected to the other member. The relative free swiveling of the gimbal rings which permits independent rotation of the members is yieldingly restrained preferably by means of a spring thereby creating a driving engagement and normally permitting torque transmission through the coupling. However, excessive or overload torques will cause the gimbal rings to swivel against the yielding restraining force which permits slip between the input and output shafts, and thus, limits the maximum torque transmitted through the coupling.

Another aspect of the invention is the provision of such a rotary coupling which is useful as a rotary shock absorber. The rotary coupling builds up to a maximum limiting torque in gradual guasi-sinusoidal manner without introducing shocks to the driving and driven members. Moreover, desired shock absorbing and torque limiting characteristics may be readily obtained.

A further aspect of the invention is the provision of a rotary coupling which is useful as a centrifugal clutch. By adding or replacing the spring restraining elements with weights in such an arrangement that the centrifugal forces acting on the weights resist swiveling of the gimbal rings to transmit torque, heavy masses can be accelerated without causing high starting torques in the driving member.

Other objects and advantages of the present invention will become apparent as the following description proceeds.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

BRIEF DESCRIPTION OF THE DRAWINGS

In said annexed drawings:

FIGS. 1 and 2 are a simplified illustration of the rotary coupling of the invention, and more particularly:

FIG. 1 is a perspective view of the rotary coupling; and

FIG. 2 is an exploded perspective view of the rotary coupling of FIG. 1;

FIG. 3 is a rotary coupling similar to that of FIGS. 1 and 2, but modified for use as a centrifugal clutch;

FIGS. 4-8 illustrate a practical construction of the rotary coupling according to the invention, and more particularly:

FIG. 4 is a plan view, partially broken away, of the rotary coupling in a position when no or low torque is being transmitted through the coupling such that the precompression forces of the springs have not been overcome;

FIG. 5 is a vertical section view of the rotary coupling of FIG. 4, taken along the section line 5—5 thereof;

FIG. 6 is a vertical section view of the rotary coupling of FIG. 4, taken along the line 6—6 thereof;

FIG. 7 is a vertical section view of the rotary coupling of FIG. 4 taken along the same section line as that of FIG. 5, but illustrating such coupling after overload with the coupling disengaged; and FIGS. 8A and B are fragmentary section views of the rotary coupling of FIG. 4, taken along the line 8—8 thereof, with the coupling engaged and disengaged, respectively.

DESCRIPTION OF THE PREFERRED EMBODIMENTS

Figure 5:
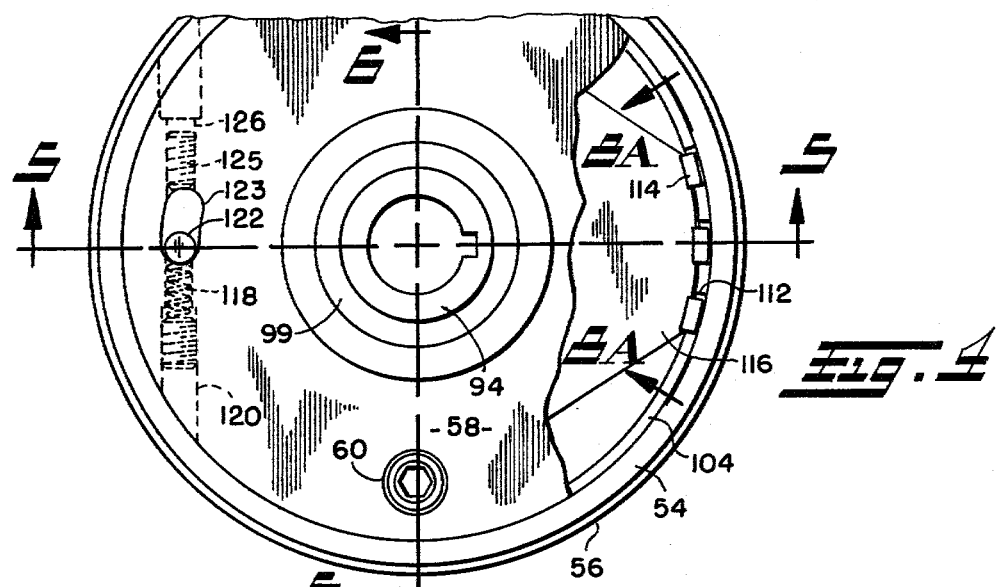

Referring now to the drawings and initially to FIGS. 1 and 2, a simplified representation of the device according to the invention is designated generally by reference numeral 10 which couples together rotary shafts 12 and 14, one of which is a driving shaft and the other a driven shaft. Preferably, the axes of the shafts 12 and 14 are aligned, however, it is contemplated that the device may be used with the shafts skewed.

The device 10 coupling the shafts 12 and 14 comprises a yoke 16 secured to the shaft 12. Trunnioned within the yoke 16 by trunnion pins 18 is an outer gimbal joint or ring 20 with the axis of rotation thereof being transverse to that of the shaft 12. An inner gimbal joint or ring 22 is trunnioned or pivotally connected within the outer gimbal ring 20 by trunnion pins 24 aligned along a diameter of the outer gimbal ring 20 at a right angle to the axis through the trunnion pins 18. Accordingly, the gimbal rings 20 and 22 are secured to the yoke 16 in well known manner.

The shaft 14 has secured thereto an element such as a circular swash plate 28 which is inclined at an angle to the planes normal to the respective axes of the shafts 12 and 14. The swash plate 28 is slidingly received in a slot 30 in the inner gimbal ring 22 whereby such ring 22 is held inclined to the axes of the shafts 12 and 14. With the gimbal rings 20 and 22 free to pivot or swivel about their respective axes, the shafts 12 and 14 are free to rotate independently of each other whereby no torque will be transferred through the device 10.

To provide for transmission of torque through the device 10, pivoting or swiveling of the gimbal rings is yieldingly restrained or impeded. Such yielding restraint may be provided by coil springs 34 connected between the outer ring 20 at the trunnion pins 18 and the yoke 16. Preferably, the springs bias the outer gimbal ring to a position normal to the axis of shaft 12.

In operation, when torque is applied to one of the shafts 12 and 14, the applied torque will cause the swash plate 28 to slide in the slot 30 relative to the inner gimbal ring 22. Because of the fixed angular inclination of the swash plate, the outer gimbal ring 20 will be urged against the spring biasing forces from its normal position at right angles to the axis of the shaft 12 to a position inclined to such axis. The maximum torque that may be transmitted through the device 10 is believed that which causes the outer gimbal ring 20 pivotally to oscillate through the inclination of the swash plate 28 (in alignment therewith) and which permits the shafts 12 and 14 to slip relative to one another without increasing the applied torque. Any lesser applied torque is believed to result in the rings being tilted from the position shown in FIG. 1, but with the shaft 12 being rotated less than 90° relative to the shaft 14 and with the outer gimbal ring 20 pivoted from a position at right angles to the axis of shaft 12 but not to the angle of inclination of the swash plate 28. As the gimbal rings 18 and 22 will thus be restrained by springs 34 from pivoting further, such lesser torque will be transmitted through the coupling.

It can be seen that the coupling 10 does not rely upon frictional forces to transfer torque. Preferably, any friction between the relatively moving parts is at a minimum providing for long service even while withstanding overload torques for extended lengths of time under high speed conditions.

Moreover, the coupling will serve as a shock absorber between the shafts 12 and 14. Maximum torque will be built up in gradual quasi-sinusoidal manner without introducing shocks.

Referring now to FIG. 3, wherein primed reference numerals are employed to designate like parts to those designated above with like reference numerals, a modified coupling 10' may serve as a centrifugal clutch. The above described springs 34 may be replaced with diametrically opposed weights 40 secured to the outer gimbal ring 20' at 90° to the trunnion pins 18'. Rotation of the coupling 10' preferably by driving shaft 12' will tend to maintain the outer gimbal ring 20' horizontal by centrifugal force. Of course, at lesser speeds, lesser torque is required to cause the outer gimbal ring 20' to pivot than at greater speeds. Accordingly, only low torques will be transmitted through the coupling at low speeds. However, as the speed of the driving shaft 12' increases, the centrifugal forces opposing pivoting or swiveling of the outer gimbal ring 20' will increase whereby greater torques will be transmitted to the driven shaft 14'. Thus the coupling 10' will act as a centrifugal clutch allowing the acceleration of high inertia masses without requiring high starting torques in the driving prime movers connected to the driving shaft.

Figures 6, 6A, 6B:
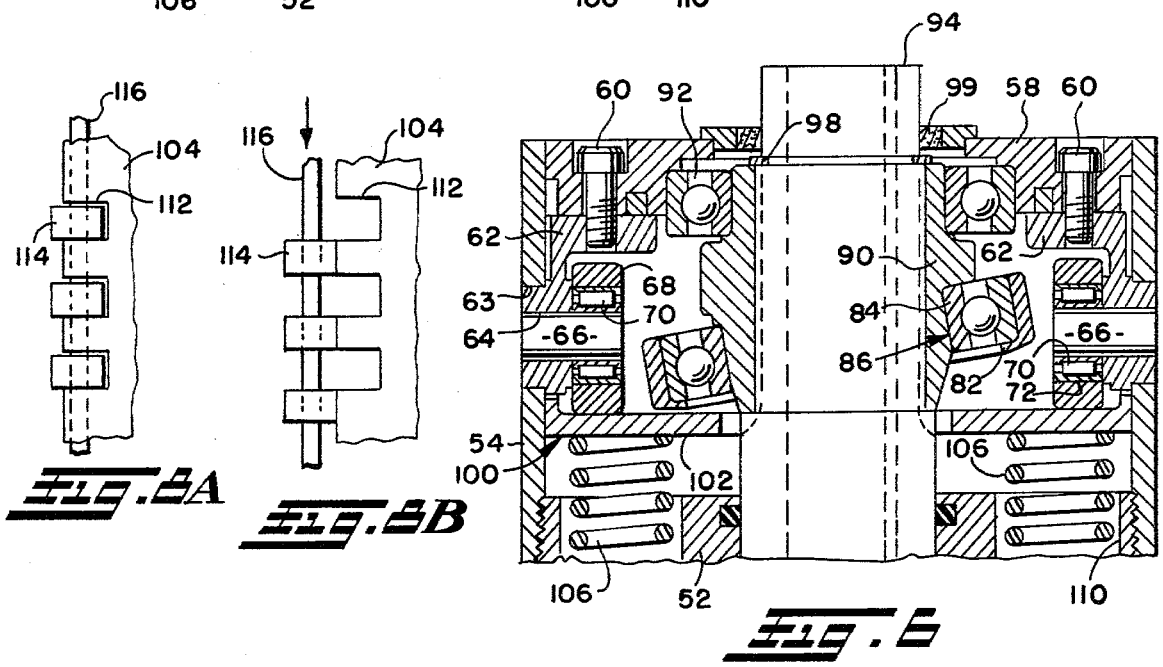

Referring now to FIGS. 4–6, a practical construction of a torque limiting coupling according to the invention is designated generally by reference numeral 50. The coupling 50 comprises a circular flange plate 52 which may be secured to a shaft in a conventional manner. The flange plate 52 is threadedly received in a cylindrical housing 54 and is locked in position by lock nut 56. The housing 54 has secured therein at its other end opposite the flange plate 52 a circular end plate 58 to which is secured by fasteners 60 inwardly axially extending yoke 62. The yoke 62 may radially extend through openings 63 in the housing 54 to rigidify the same. The yoke 62 includes diametrically opposed radial bores 64 in which are press fit trunnion pins 66 which pivotally mount or interconnect an outer gimbal ring 68 to the yoke 62. Preferably, bearings 70 are provided in diametrically opposed radial bores 72 in the outer gimbal ring 68 in which turn the trunnion pins 66.

The outer gimbal ring 68 further has a second set of diametrically opposed bores 74 therein which are at 90° to the bores 64 or 72 which receive for rotation therein trunnion pins 76. Preferably bearings 78 are provided in such bores 74 to provide for frictionless rotation of the pins 76. The pins 76 are secured to or integral with an inner gimbal ring 82 which has press fit therein the outer race 84 of a bearing 86. The inner race 88 of the bearing 86 is press fit on a shaft coupling 90 with its axis inclined to the axis of rotation of the shaft coupling as best seen in FIG. 6. The shaft coupling 90 is journaled in the end plate 58 by bearing 92. The shaft coupling 90 includes an inner bore in which is received a shaft 94 and the same are interconnected by key 96 and snap ring 98. Preferably, a suitable seal or packing 99 is provided to seal the interior of the coupling from foreign matter and/or prevent leakage of lubricating fluid if provided in the interior of the housing. As thus far described, the shaft 94 can be rotated independently of the flange 52 whereby no torque can be transmitted through the torque limiting coupling 50 because the gimbal rings 68 and 82 are free to swivel.

Transmission of torque through the device 50 is obtained by providing a cylindrical piston 100 movable axially within the housing 54 which yieldingly restrains pivoting of the outer gimbal ring 68. The piston 100 includes circular base 102 and sleeve 104 which is suitably relieved to prevent interference with the yoke 62 as the piston moves axially within the body 54. The piston is urged against the outer gimbal ring 68 to bias the same to a position normal to the axes of rotation of the shaft 94 and flange plate 52 by a number of uniformly circumferentially spaced springs 106 disposed in respective inwardly opening counterbores 110 in the flange plate 52. The precompression of the springs and thus the biasing force acting on the outer ring 68 may be easily adjusted by loosening the lock nut 56 and adjusting the flange plate 52 in the body 54 either inwardly or outwardly. Also, the effective spring constant may be varied by substituting different springs having different spring constants.

Figure 7:
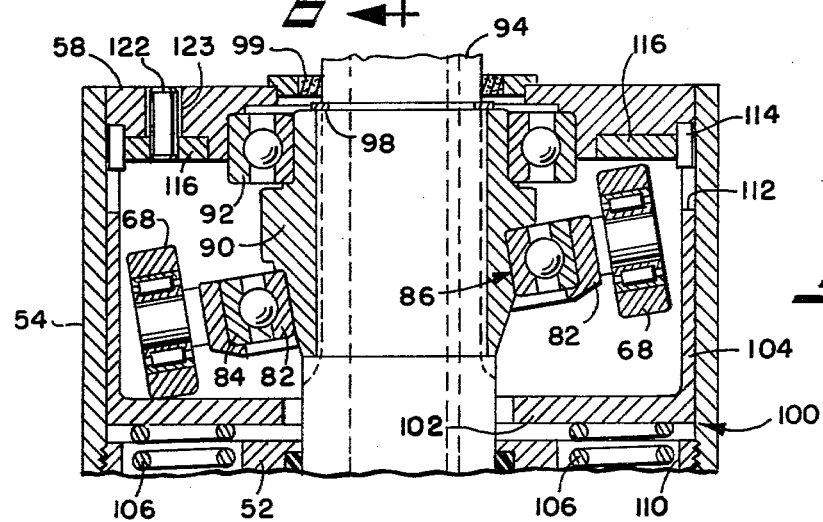

With additional reference to FIG. 7, the operation of the torque limiter coupling 50 can best be understood. Under no load or low torque conditions where the precompression forces of the springs have not been overcome, the coupling 50 will be as seen in FIGS. 4–6 with the outer gimbal ring 68 restrained or impeded from pivoting from a position normal to the rotational axes of the shaft 94 and flange plate 52 by the piston 100. As torque is applied to the coupling 50, the inner bearing race 88 of bearing 86 will rotate relative to the outer bearing race 84 causing the outer gimbal ring 68 to pivot about its axis in the yoke 62. Such pivoting of the outer gimbal ring will be restrained by the piston thus permitting torque to be transmitted through the coupling.

When the applied torque is sufficiently great, the outer gimbal ring 68 will have pivoted to the position seen in FIG. 7 where the shaft 94 has rotated 90° to the flange plate 52 and the outer gimbal ring 68 is aligned with the inner gimbal ring 82. At or before reaching such position, the shaft 94 will slip relative to the flange plate 52, or vice versa, without an increase in the transmitted torque. If such sufficiently great applied torque is sustained, the gimbal rings 68 and 82 will oscillate thus limiting the maximum torque that can be transmitted through the coupling. To vary the predetermined torque at which such slippage will occur, i.e., the maximum torque transmitted, the flange plate 52 may be adjusted inwardly in the housing 54 to increase the predetermined torque limit or outwardly to decrease the predetermined torque limit. Alternatively, the springs 106 may be replaced with springs having different spring constants.

It should be appreciated that the coupling 50 will also act as a rotary shock absorber because maximum torque will be built up in gradual quasi-sinusoidal manner without introducing shocks. The amount of torque transmitted through the coupling is proportional to the forces restricting the swiveling of the gimbal rings 68 and 82. Moreover, it should be understood that when the springs 106 have been precompressed, the coupling will act as a relatively rigid or rigid coupling for those torques below the torque required to compress the springs further by movement of the piston 100. However, above such torque yet below the maximum limiting torque, the coupling will act as a relatively soft coupling. Such rigid and soft torque ranges can be readily adjusted by changing the amount of precompression. For example, when there is no precompression of the springs, the coupling will provide for shock absorption through the entire range of transmitted torques.

Referring now additionally to FIGS. 8A and 8B, it will be seen that the torque limiting coupling 50 may be provided with an overload disengage which will uncouple the shaft 94 from the flange plate 52 upon overload. As shown, the top of the piston sleeve 104 includes therealong a plurality of axially open slots 112 which, when the piston 100 is in the position shown in FIGS. 4–6, mate with a plurality of radially outwardly extending squared teeth 114 on a sector plate 116. The sector plate 116 is secured to the end plate 58 by the yoke 62 and is slidingly rotatable relative to the end plate. The sector plate 116 is biased to rotate clockwise as seen in FIG. 4 by a spring 118 received in a chordal bore 120 in the end plate which acts on a pin 122 press fit in the sector plate to extend through small arcuate slot 123 in the end plate. However, rotation of the sector plate is prevented by the mating engagement of the teeth 114 in the slots 112.

When the piston sleeve 104 moves downwardly as the outer gimbal ring 68 is urged to the position seen in FIG. 7 by applied torque, the teeth 114 will disengage from the slots 112 and the sector plate 116 will be free to rotate slightly relative to the piston 100 to position the teeth intermediate the slots thereby preventing return upward movement of the piston, the extent of such rotation being limited by the pin 122 engaging the end of arcuate slot 123. With the piston locked against upward movement, the gimbal rings 68 and 82 will be free to swivel without restraint thus disengaging or uncoupling the shaft 94 from the flange plate 52. To reset the coupling 50 after disengagement, a set screw 125 threadedly received in chordal bore 126 opposite bore 120 is moved inwardly against the pin 122 to rotate the sector plate to align the teeth with the slots in the piston sleeve after which the teeth and slots will reengage. It should be appreciated that the set screw 125 may also be used to prevent overload disengage when not desired.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

What I claim is:

1. A rotary coupling comprising drive and driven members, coupling means interconnecting said members, said coupling means including a pair of gimbal rings secured to one of said members and pivotable on axes at right angles to each other, said gimbal rings being arranged to oscillate about their respective pivot axes to permit independent rotation of said members, means secured to the other of said members having a surface inclined to the plane normal to the rotational axis of said other of said members and in confronting sliding engagement with one of said gimbal rings for maintaining said one of said gimbal rings at the same inclination as said inclined surface, and means normally for restraining such oscillation of said gimbal rings for transmitting torque from said drive member to said driven member except that at an overload torque, said gimbal rings are caused to oscillate thus limiting the torque transmitted from said drive member to said driven member.

2. The coupling of claim 1 wherein said pair of gimbal rings include a first and second gimbal ring pivotally secured, respectively, to said one of said members and said first gimbal ring, and said second gimbal ring has a surface in confronting sliding engagement with said inclined surface.

3. The coupling of claim 2 wherein said first and second gimbal rings are outer and inner rings, respectively.

4. A torque limiting coupling comprising a drive member and a driven member rotatable about an axis, coupling elements secured to each of said members, and means interconnecting said elements to cause at an overload torque one of said elements to oscillate between a driving position and drive interrupt position thus limiting the torque transmitted from one to the other of said members, said elements each having confronting surfaces in sliding contact with one another and at such overload torque being slidable relative to one another, said one of said elements being pivotally secured to its respective member for oscillation about its pivot axis, said means to cause including spring means connected to said one of said elements and operable to restrain pivoting thereof, said one of said elements being a first gimbal ring pivotally secured to a second gimbal ring in turn pivotally secured to one of said members with the respective pivot axes of the gimbal rings at right angles to each other, said spring means restricting oscillation of either of said gimbal rings.

5. The coupling of claim 4 wherein the other of said coupling elements is a swash plate secured to the other of said members which is arranged to maintain said first gimbal ring inclined at an angle to the axis of said drive and driven members.

6. The coupling of claim 5 comprising a housing connected to one of said members and the other of said members journaled in said housing.

7. The coupling of claim 6 comprising a piston movable in said housing, and said spring means urges said piston against one of said rings for restraining oscillation thereof.

8. The coupling of claim 7 comprising means for adjusting the compression strength of said spring means to adjust for different overload torques.

9. The coupling of claim 8 comprising means for disengaging said piston from said one of said rings when such overload torque is reached.

10. The coupling of claim 9 wherein said means for disengaging comprises a piston skirt and sector plate having cooperating slots and teeth, said teeth being normally aligned for movement in said slots, and means for shifting said plate relative to said skirt when said teeth are withdrawn from said slot at such overload torque to a position preventing said teeth from entering said slots thus to prevent further movement of said piston thereby disengaging said coupling.

11. A rotary coupling comprising drive and driven members having respective rotational axes; coupling means for said members including a pair of gimballed elements secured to one of said members, and inclined means secured to the other of said members and in engagement with one of said gimballed elements for maintaining said one of said gimballed elements angularly inclined to the plane normal to the rotational axis of said other of said members, whereupon said gimballed elements can oscillate about their respective pivot axes to permit said inclined means to rotate with respect to said elements and thus permit independent rotation of said members; a coupling housing for said gimballed elements; means normally for restraining such oscillation of said gimballed elements for transmitting torque from said drive member to said driven member except that at an overload torque, said gimballed elements are caused to oscillate thus limiting the torque transmitted from said drive member to said driven member, said means for restraining including a piston movable in said housing and spring means biasing said piston against the other of said gimballed elements for urging said other of said gimballed elements to an inclination different from that of the said one of said gimballed elements; and means for disengaging said piston from said other of said gimballed elements at such overload torque when said other of said gimballed elements has inclined to the same angular inclination as said one of said gimballed elements against said spring means.

12. A rotary coupling comprising drive and driven members having respective rotational axes; coupling means interconnecting said members, said coupling means including a pair of gimbal rings secured to one of said members and pivoted on axes at right angles to each other, and inclined means secured to the other of said members and engaged with one of said gimbal rings for maintaining said one of said gimbal rings inclined to the plane normal to the rotational axis of said other of said members, whereby oscillation of said gimbal rings about their respective axes permits said inclined member and thus said other of said members to rotate relative to said gimbal rings and said one of said members; and means for exerting a force on said gimbal rings normally to restrain oscillation thereof whereby torque may be transmitted from said drive member to said driven member, except that at overload torques, said gimbal rings are caused to oscillate against such restraining force to permit said members to rotate relative to one another thereby limiting the torque transmitted through said coupling.

13. The coupling of claim 12 wherein said means for exerting comprises a spring.

14. The coupling of claim 12 wherein said means for exerting comprises a weight secured to at least one of said gimbal rings and arranged to restrain the oscillation of said at least one of said gimbal rings by centrifugal force due to rotation of said weight.

15. A torque limiter comprising: an input member, an output member, a first gimbal ring pivotally connected to one of said members, a second gimbal ring pivotally connected to said first gimbal ring, the respective pivot axes of said first and second gimbal rings being at right angles to one another, a swash plate connected to the other of said members, said swash plate having a surface inclined to the plane normal to the axis of rotation of said other of said members, said swash plate at said surface being in sliding confronting relationship with said second gimbal ring for maintaining the latter at the inclination of said surface, and biasing means normally for maintaining said first ring at an inclination different than that of said surface of said swash plate.

16. The rotary coupling comprising drive and driven members, coupling means for said members including at least one pivoting element interconnecting said members which is arranged to oscillate about its pivot axis to permit independent rotation of said members, and means normally for restraining such oscillation of said pivoting element for transmitting torque from said drive member to said driven member except that at an overload torque, said pivoting element is caused to oscillate thus limiting the torque transmitted from said drive member to said driven member, said means for restraining comprising a weight secured to said pivoting element and arranged to restrain such oscillation of said pivoting element by centrifugal force due to rotation of said weight.

* * * * *